United States Patent [19]

Gross et al.

[11] Patent Number: 4,467,222
[45] Date of Patent: Aug. 21, 1984

[54] TIMER WITH TOUCH CONTROL

[75] Inventors: Thomas A. O. Gross, Lincoln; Edward Lalumiere, Woburn; William A. Arzberger, Medfield, all of Mass.

[73] Assignee: Jet Spray Corp., Norwood, Mass.

[21] Appl. No.: 408,267

[22] Filed: Aug. 16, 1982

Related U.S. Application Data

[63] Continuation of Ser. No. 155,450, Jun. 2, 1980, abandoned.

[51] Int. Cl.³ .......................................... H01H 43/00
[52] U.S. Cl. .................................... 307/115; 307/141; 361/193
[58] Field of Search ............... 307/115, 116, 117, 141; 340/369 R, 309.4; 361/193

[56] References Cited

U.S. PATENT DOCUMENTS

| | | | |
|---|---|---|---|
| 4,031,408 | 4/1977 | Holz | 307/116 |
| 4,032,931 | 6/1977 | Haker | 340/365 R |
| 4,069,659 | 1/1978 | Harris et al. | 307/116 |
| 4,085,302 | 4/1978 | Zenk et al. | 307/115 |
| 4,119,864 | 10/1978 | Petrizio | 307/116 |
| 4,159,496 | 6/1979 | Stevens | 307/115 |
| 4,234,801 | 11/1980 | Small | 307/115 |

Primary Examiner—E. A. Goldberg
Assistant Examiner—Todd E. DeBoer
Attorney, Agent, or Firm—Wolf, Greenfield & Sacks

[57] ABSTRACT

The timer controls a dispensing machine and in particular controls the dispensing cycle for a product such as coffee, a beverage, or instant mashed potatoes. The control includes regulation of the water portion of the cycle and the solid or powder portion of the cycle. The timer is controlled by a plurality of touch switches each coupling via a resistor network to the control logic of the timer. The control logic is preferably CMOS-type having a high input impedance permitting use of a resistor network of high resistance to limit current flow especially under fault. The touch switches control functions such as "hot water", "large portion", "small portion", "stop", and "push and hold".

15 Claims, 4 Drawing Figures

TIMER WITH TOUCH CONTROL

This is a continuation of application Ser. No. 155,450, filed June 2, 1980, now abandoned.

BACKGROUND OF THE INVENTION

The present invention relates in general to a timer for controlling the dispensing cycle of the dispensing machine. The timer may be used in association with the dispensing of such products as instant mashed potatoes, coffee, juices, or beverages. More particularly, in accordance with this invention there is provided a timer with improved touch control.

It is desirable in accordance with the present invention to maintain current flow associated with control switches for a timer, such as one used in association with a dispensing machine, at a relatively low value, preferably less than 5 milliamperes under fault. One technique used in the prior art to alleviate problems due to switch failure, is to provide an isolation transformer to isolate the logic power supply from the line voltage. In this way the hazard of electrocution is removed even if one were to make contact with metallic portions of the touch switches. However, the cost of an isolation transformer is quite excessive, especially if it is required to carry both the power of the load as well as the logic power. In the example referred to herein, the load power includes power for a solenoid and gear motor. If the transformer supplies only the logic power, then separate means such as optical couplers are usually provided to isolate the load switches which may be triacs, from the logic. There is substantial cost involved in the use of such an isolation transformer.

One object of the present invention is to provide a timer, preferably for use in controlling a dispensing cycle associated with the dispensing machine, and which does not require the use of a transformer for power isolation.

Transformerless DC power supplies with off-line rectifiers are also well known; the AC/DC tube radio being a familiar example. The intrinsic electrocution hazard in these radios is reduced by insulating the chassis with cabinetry and control knobs which prevent the operator from making a direct contact with metal. However, with many dispensing machines, the control switches themselves cannot be relied upon solely to maintain the electrical isolation needed to prevent shock.

SUMMARY OF THE INVENTION

To accomplish the foregoing and other objects of this invention there are provided touch switches which each control a certain function associated with the timer. For example, in one embodiment described herein, five touch switches are used identified as "hot water", "large", "stop", "push and hold", and "small". These switches are preferably of the type that includes a conducting membrane which contacts a back plate. The thin membrane separates the operator's finger from circuits having an open circuit voltage with respect to ground equal to that of the power line. Each of the flexible surfaces of the switch are preferably isolated from the circuit board by a pair of resistors of relatively large value, preferably on the order of 150K ohms each. Two resistors are preferred to guard against the possibility of one having an improper low value. There is also added insurance against voltage break down that might occur when only a single resistor is employed. The resistor values are selected so that for a worse case condition, the current is below 5 milliamperes. Thus, if it is assumed that as a result of vandalism, for example, all switches are in contact with the common back plate then the metallic parts of the switch assembly are exposed to a potential victim. Even under this condition in accordance with the invention, the current flow is still limited to less than 5 milliamperes. The problem with the use of such high value resistors is that with conventional logic circuitry such as TTL circuitry, sufficient voltage swing is not possible. Accordingly, in accordance with the principles of this invention the logic circuitry that is employed is of the high input impedance type. The preferred logic is CMOS logic which is characterized by a high input impedance or resistance. This impedance is thus comparable to the series resistance coupling to the touch switches. The high impedance of the CMOS gates permits the use of input shunt resistors of relatively high value, preferably over one meg ohm. In the embodiments disclosed herein, these resistors preferably have a value of 3.3 meg ohm. The combination of the CMOS logic along with the high resistance switch circuits provide essentially a shock-proof system. Furthermore, this is provided without the use of any costly isolation transformer or relay interface.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION OF THE DRAWINGS

Figure 1:
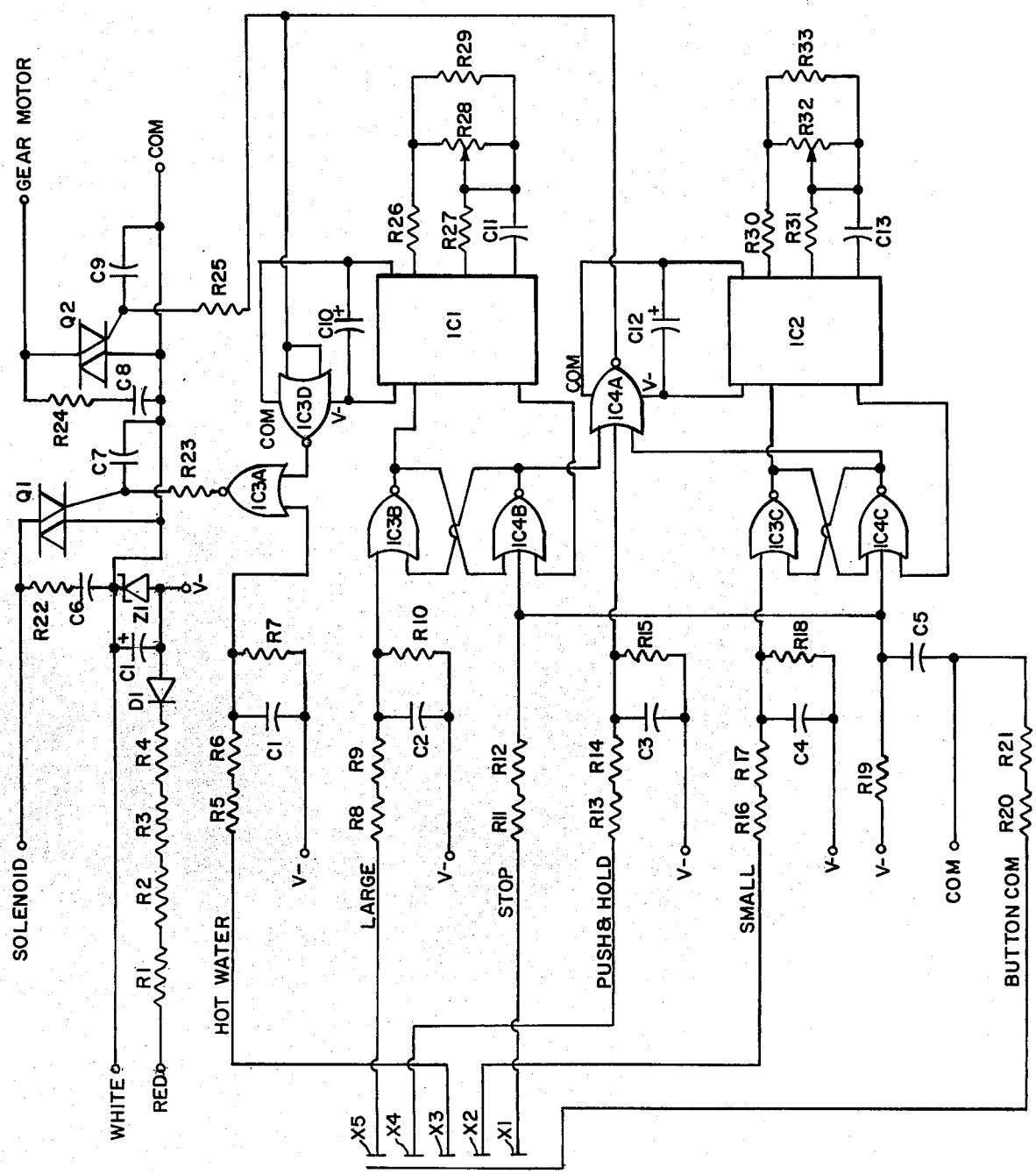
FIG. 1 is an electrical circuit diagram showing a timer used in association with a coffee dispenser.

FIG. 1 shows a timing circuit for use with a dispensing machine and in particular a coffee dispenser having associated therewith a solenoid for controlling water flow and a gear motor, as depicted in the drawing, for controlling the coffee powder. The solenoid and gear motor are controlled respectively from the triac Q1 and Q2. For each of the triacs are in turned controlled from the logic circuitry shown in FIG. 1. This logic circuitry includes integrated circuit timers IC1 and IC2, and a plurality of logic gates IC3 and IC4. All of the gates described in FIG. 1 are NOR gates. The NOR gates IC3B and IC4B form a bistable switch associated with the timer IC1. Similarly, the NOR gates IC3C and IC4C form another bistable switch associated with the second timer IC2. Both of the timers IC1 and IC2 have controllable circuitry associated therewith, including potentiometers R28 and R32 associated respectively with timers IC1 and IC2 for controlling the duration of each of these timers. The timer IC1 may be referred to as the "large" timer while the timer IC2 may be referred to as the "small" timer. These designations refer to the length of the time period which may be set by these two potentiometers R28 and R32. In addition to the potentiometers, other circuitry including resistors R26–R33 and capacitors C11 and C13 control the timing of each of these timers.

In addition to the logic shown in FIG. 1, which is all CMOS logic, there are provided a plurality of separate networks which are each R-C networks coupling between the logic and each of the switches associated with the touch switch panel. The specific switch construction is shown and discussed hereinafter with regard to FIG. 3.

The embodiment of FIG. 1 comprises five such switches identified as switches X1, X2, X3, X4, and X5. One side of each of these switches couple to the R-C networks while the common side couples to the button common line which couples by way of resistors R20 and R21 to the common power supply terminal. In FIG. 1 the switch X1 is the "stop" switch, the switch X2 is the "small" switch, the switch X3 is the "hot water" switch, the switch X4 is the "push hold" switch, and switch X5 is the "large" switch. The hot water switch X3, for example, couples by way of resistors R5 and R6 to capacitor C1. A further shunt resistor R7 is coupled in parallel with capacitor C1. This network then couples to one input of the NOR gate IC3A. Normally, this input to the gate IC3A is at voltage $-V$ which is representative of logic zero. Thus, with the touch switch X3 open, the input to this gate is kept at this $-$voltage by the shunt resistor R7 which is preferably a 3.3 meg ohm resistor. A large value resistor of that type may be used because of the very high input impedance of the gate IC3A. However, when the switch, such as switch X3 is closed, the resistors R5 and R6 are then connected via the switch to the "button common" terminal which is referenced at $+12$ volts, or at least at a positive voltage with respect to the negative common voltage. The voltage across the resistor R7 then becomes:

$$E_{R7} = 12 \frac{3.3 \times 10^6}{(3.3 \times 10^6) + 6 \times 10^5} = 12 \times 0.846 = 10 \text{ volts}$$

This 12 volt difference is more than enough to establish a logic one level. However, if the OR gate that was used were instead a TTL gate or other bipolar device, it would be necessary to provide an FET buffer.

FIG. 1 also shows a power supply comprising a zener diode Z1, capacitor C1, series resistors R1–R4 and diode D1. A conventional 110 VAC or 220 VAC line may be connected at the input to the power supply. One output from the supply is the voltage $-V$ depicted in FIG. 1. The other voltage is described as the common signal which is a function of the zener voltage. In FIG. 1 the voltage COM and $-V$ are both similar alternating voltages but deviating at all times during their waveform by the voltage established by the zener diode Z1.

In addition to the switch X3, as previously indicated, there are four other switches which couple to RC networks which in turn couple to the logic shown in FIG. 1. Thus, for example, the switch X5 couples by way of resistor R8 and resistor R9 to capacitor C2 with resistor R10 being a shunt resistor across capacitor C2. This RC network then couples to the set input of the bistable device including gate IC3B. The stop input from switch X1 also couples by way of resistors R11 and R12 to the reset side of both bistable devices. The line that couples from resistors R11 and R12 couple more specifically, to gates IC4B and IC4C.

The push-hold switch X4 couples by way of resistors R13 and R14 to capacitor C3 with a shunt resistor R15 coupled thereacross. This network couples to a gate IC4A for providing an enabling signal to the output triac by way of that gate. As previously mentioned, the button common input couples by way of resistors R20 and R21 to the common terminal. Finally, the input from "small" switch X2 couples by way of resistors R16 and R17 to capacitor C4 with shunt resistor R18 coupled across capacitor C4. This RC network couples to the set input of the second bistable device, or more particularly directly into gate IC3C thereof.

Basically, the timer IC1 is timed to control the "large" portion that is being dispensed while the timer IC2 is for controlling the "small" portion that is being dispensed. The output timing circuits including the potentiometers R28 and R32, mentioned previously, are set for these respective time periods. When the large button is activated, the first bistable device is set causing the output from gate IC3B to control the timer IC1 and set the timer into operation. The timer IC1 then times out and at the end of its time period the output therefrom couples to the gate IC4B for resetting the bistable latch. This action passes a signal by way of the gate IC4A directly to the gear motor for operation thereof during the timing period determined by IC1. Similarly, the same signal is coupled by way of inverter IC3D and gate IC3A for causing concurrent operation of the triac Q1 and the output solenoid associated therewith. Similarly, for an operation with a "small" portion, the other bistable device is set by operation of the switch X2. When this occurs an output from the gate IC3C activates time IC2. At the end of its predetermined time, a signal is coupled back to the reset input of the second bistable device, at the input to gate IC4C causing a resetting action. This causes a signal to be coupled to the NOR gate IC4A for causing operation of the gear motor and the solenoid as explained previously. The gate IC4A may also be enabled from the switch X4 which is the "push and hold" switch. This means that as long as the switch X4 is depressed, then the gate IC4A is enabled and the dispensing can occur by way of the activated triac Q1 and Q2.

The stop button X1 may also be operated and in the case of its operation the bistable devices are both reset by signals by way of resistors R11 and R12 into the respective gates IC4B and IC4C. This action essentially bypasses the operation of the timers so that if previously either of the timers IC1 or IC2 have been activated, then operation of the stop button interrupts this action.

The values of R20 and R21 and other resistors, such as resistors R5 and R6, are chosen with a sufficiently high value so that with any malfunction of the switches including a total malfunction any shock that one might suffer will be below 5 ma. Thus, if it is assumed that, as a result of vandalism or the like, all five touch pads are in contact with the common back plate, described later in FIG. 3, there will not be any shock hazzard. With the arrangement described, there would thus be six parallel resistance paths each of 300K ohms each bridging the exposed metal and the common of the subsystem which in turn is tied to one side of the line labelled "white" in FIG. 1. The input "white" line can be 120 VAC removed from ground and the system frame. In some applications this voltage can also be 240 volts. Using the worse case of 240 volts with six 300K ohm resistors in parallel this still yields a current of only 4.8 ma. Thus, there is provided herein a simplified means of timer operation employing touch switches and which does not require the use of an isolation transformer. There is provided herein the connection of a high input impedance logic circuit with what has been previously used as a low impedance touch switch. By employing high input impedance logic, then the series resistors may be sufficiently high for the purpose of current limiting without on the other hand affecting the normal operation of the logic, including switching between different logic levels.

In connection with the diagram of FIG. 1, the following table gives representative component values for substantially all components shown therein:

R1 3.3K 10% 1 Watt
R2 3.9K 10% 1 Watt
R3 3.9K 10% 1 Watt
R4 3.3K 10% 1 Watt
R5 150K 10% ¼ Watt
R6 150K 10% ¼ Watt
R7 3.3 MEG 10% ¼ Watt
R8 150K 10% ¼ Watt
R9 150K 10% ¼ Watt
R10 3.3 MEG 10% ¼ Watt
R11 150K 10% ¼ Watt
R12 150K 10% ¼ Watt
R13 150K 10% ¼ Watt
R14 150K 10% ¼ Watt
R15 3.3 MEG 10% ¼ Watt
R16 150K 10% ¼ Watt
R17 150K 10% ¼ Watt
R18 3.3 MEG 10% ¼ Watt
R19 3.3 MEG 10% ¼ Watt
R20 150K 10% ¼ Watt
R21 150K 10% ¼ Watt
R22 47 OHM 10% ¼ Watt
R23 2.0K OHM 5% ¼ Watt
R24 47 OHM 10% ¼ Watt
R25 2.0K OHM 5% ¼ Watt
R26 16K OHM 5% ¼ Watt
R27 820K OHM 10% ¼ Watt
R28 500K OHM 20% ¼ Watt Horz. Mount Trimmer
R29 560K OHM 10% ¼ Watt
R30 16K OHM 5% ¼ Watt
R31 680K OHM 10% ¼ Watt
R32 250K OHM 20% ¼ Watt Horz. Mount Trimmer
R33 390K OHM 10% ¼ Watt C1 0.02 UF+80%-20% 20 V Ceramic
C2 0.02 UF+80%-20% 20 V ceramic
C3 0.02 UF+80%-20% 20 V ceramic
C4 0.02 UF+80%-20% 20 V ceramic
C5 0.02 UF+80%-20% 20 V ceramic
C6 0.005 UF GMV 1.6 KV ceramic
C7 0.02 UF+80%-20% 20 V ceramic
C8 0.005 UF GMV 1.6 KV ceramic
C9 0.02 UF+80%-20% 20 V ceramic
C10 10 UF 20% 16 V Tantalum-Spraque 199D or Equal
C11 0.022 UF±10% 50 V Polycarbonate Seacor #112 or Equal
C12 10 UF 20% 16 V Tantalum-Spraque 199D or Equal
C13 0.005 UF±10% Polystrene Mallory SXM 250
C14 50 UF+80%-20% 16 V Alum. Electrolytic Spraque 30D or Equal Q1 T2301PD Triac
Q2 T2301PD Triac

Z1 1N4742

D1 1N2071/1N4004
D2 1N4148

IC1 4060BE
IC2 4060BE
IC3 4001BE
IC4 4025BE

Figure 2A:
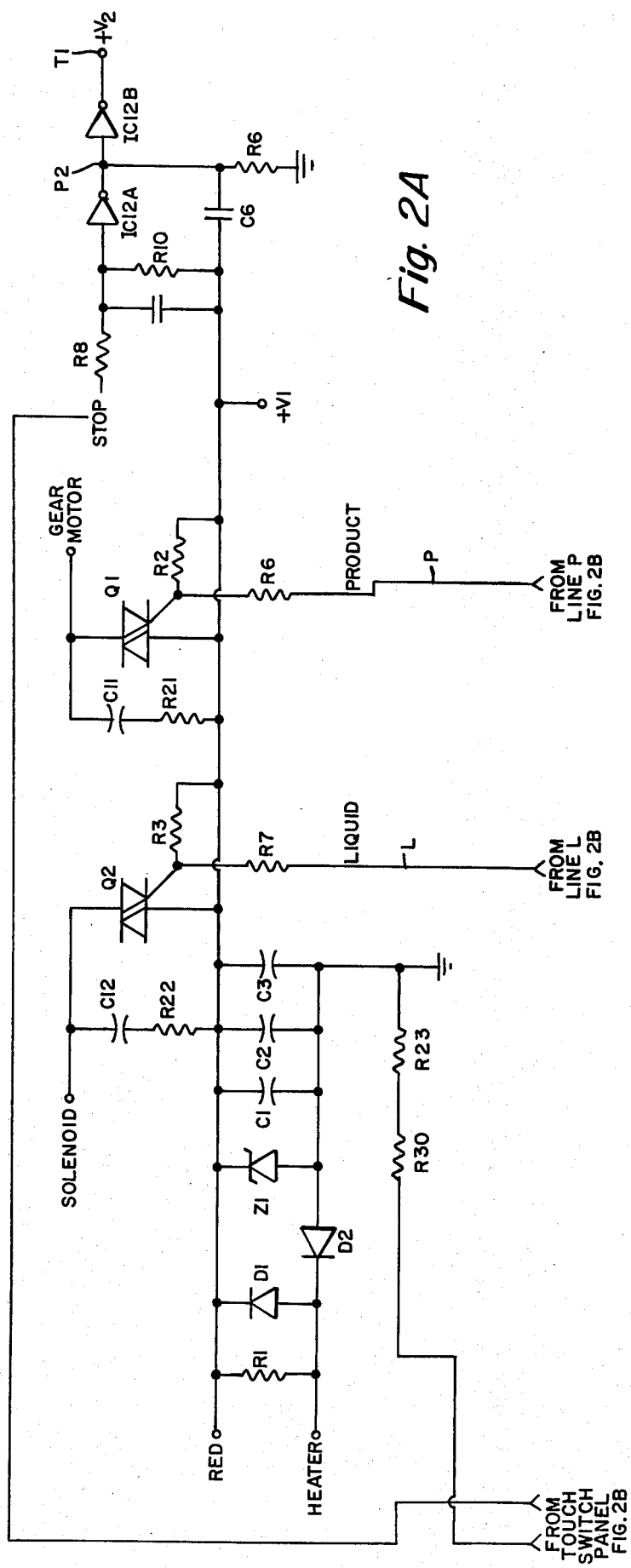
FIGS. 2A and 2B shows an electrical schematic diagram showing a timer used in association with a potatoe dispensing machine.
Figure 2B:
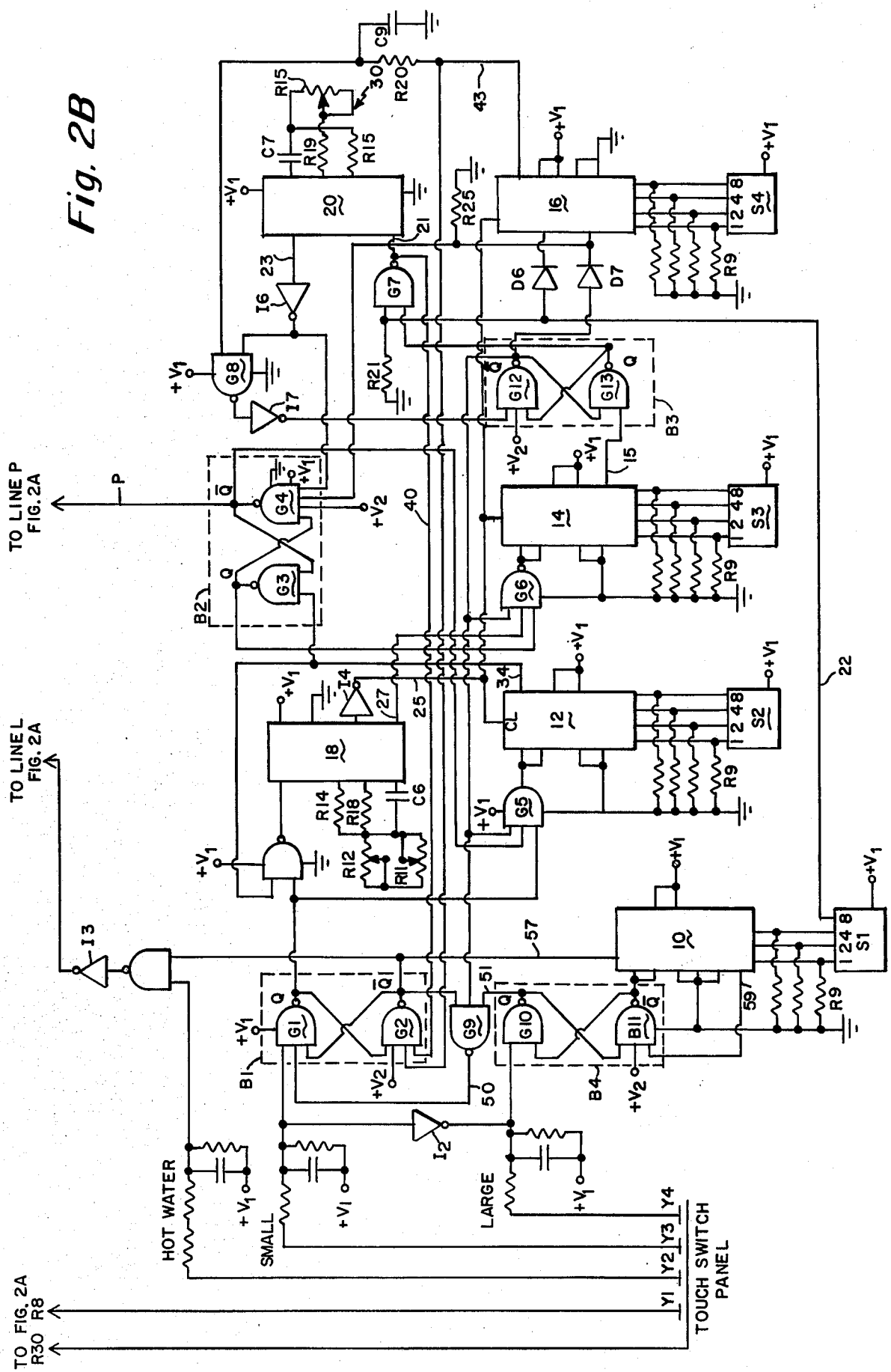

FIGS. 2A and 2B show another embodiment of a timer somewhat more complex than the embodiment described previously. A substantial portion of the operation of this timer is described in a copending application Ser. No. 935,179 filed Aug. 21, 1978 and commonly owned with the present assignee. This timer is adapted for use in the dispensing of instant mashed potatoes.

FIG. 2A discloses the power supply for providing certain voltages such as +V1 and +V2 used with the circuit of FIG. 2B. This power supply operates from the 115 VAC line which is shown in FIG. 2A connecting across the parallel combination of resistor R1 and diode D1. This circuit along with diode D2, zener diode Z1 and capacitors C1 and C2 comprises a halfwave rectifier circuit providing a relatively constant voltage level across capacitors C2 and C3. The signal on line P controls the triac Q1 which in turn controls the motor M for the auger not shown in the drawing, but understood to advance the flow of the product to a mixing chamber of the dispensing device, this chamber also receiving water controlled by the solenoid K also depicted in FIG. 2A. Solenoid K is controlled from triac Q2 which is in turn controlled from line L. A stable voltage is provided at point "A", logic voltage +V1, used in most of the circuits shown in FIG. 2B.

FIG. 2A also shows a "STOP" input which is actually a back contact of switch Y1 used for coupling the power to the power supply. This switch is used for the timer "stop" function. When the terminal "STOP" is at a high level, the circuit including gates IC12A and IC12B provides a voltage which is a relatively constant positive voltage which, when coupled by way of the inverter IC12B provides a ground or zero voltage at terminal T1. On the other hand, when the input terminal is at ground or goes to ground, then there is a positive level on the order of 10 volts at terminal T1. The use of the voltage +V2 from the circuit is discussed in more detail with reference to the diagram of FIG. 2B.

In FIG. 2A there are two lines L and P which may be referred to as the liquid and product lines, respectively. When there is a high level signal on line L a driving current is provided to the gate of the triac Q2 causing the triac to conduct and energize the solenoid K to permit water flow. When the level on line L is low, the triac Q2 is turned off, which in turn turns off the solenoid K interrupting the water flow. The signal on the product line P operates similarly, and when this signal is high, the triac Q1 is on operating the motor M. When the signal on line P goes to its low state, then the motor operation ceases.

FIG. 2B shows the control in accordance with the present invention for providing signals to the lines L and P coupling between the circuitry of FIGS. 1 and 2. There is a first bistable device B1 for controlling line L and a second bistable device B2 for controlling signals to the line P. The bistable device B1 includes a pair of NAND gates G1 and G2 cross-coupled in a bistable configuration. Similarly, the device B2 comprises a similar pair of gates G3 and G4 also intercoupled in a bistable condition.

The circuit of FIG. 2B also includes switches Y3 and Y4 for controlling, respectively, small and large portions as described in further detail hereinafter. There are a number of timing devices shown in FIG. 2B which are identified more specifically in a table that follows. These devices include timers 10, 12, 14, and 16, and the main clock 18, and a second clock or timer 20. The devices 10, 12, 14 and 16 may be of one type while the devices 18 and 20 may be of a different type. Associated with the timers 10, 12, 14 and 16 are switches S1, S2, S3 and S4, respectively. The switch S1 actually provides two functions, with one output to line 22 being settable in one of two different states, typically either a high state or a low state for determining whether the post-rinse is positive or negative. In the embodiment of FIG. 2B for a positive post-rinse, the line 22 is at its low level whereas for a negative post-rinse the line 22 is at its high level. The other three outputs from switch S1 couple to three inputs of the timer 10. These three inputs determine in a binary coded decimal fashion, an initial count to which the device 10 is initially set. Hereinafter, there is a further discussion of the operation of the timer 10 in conjunction with a repeating cycle in accordance with the control for providing larger portions.

The switch S2 has four outputs and may be set in 16 different positions for providing a binary coded decimal signal to four corresponding inputs to the timer 12. The switches S3 and S4 are similarly connected to the timers 14 and 16, respectively. The switch S2 controls the pre-rinse period in conjunction with the timer 12. This switch is preferably operated through ten positions even though they have the capability of more positions. In one embodiment this timer 12 and associated switch S2 may vary the pre-rinse period from zero to 1.8 seconds in 0.2 second increments. The switch S3 controls the duration of product and water and the control is such that there is provided a minimum period of 3.5 seconds, for example, even with the switch S3 set at its zero position. From this zero position, the interval can be expanded up to a total period of 5.3 seconds again at 0.2 second intervals, for example. The switch S4 controls the duration of the positive post-rinse period in association with the timer 16. Again, because of the common input clocking to devices 12, 14 and 16 from line 25 of device 18, the positive post-rinse period may also be varied from zero up to, for example, 1.8 seconds in 2 second increments. The circuit 30 associated with the timer or clock 20 and including the potentiometer R15 is adapted to set the negative post-rinse period when in that mode of operation. Typically, this period is set between 0.25 and 0.5 seconds.

First, operation is considered through one basic cycle which includes a pre-rinse period, a main period, and a post-rinse period. It is also assumed that the circuit is conditioned for a negative post-rinse rather than a positive post-rinse. Thus, the circuit controls lines L and P to terminate liquid prior to termination of product.

When the switch Y3 is closed and assuming that the circuit has been powered, a positive signal is coupled to the inverter 12. This signal may be low pass filtered by means of the circuit including resistor R16 and capacitor C10. This high level signal is inverted by inverter 12 to a low level signal which sets the bistable device B1 causing a low level signal on its output Q. This signal is inverted by inverter 13, causing a positive driving voltage on line L which, as previously discussed, causes operation of the solenoid K to initiate water flow to the mixing chamber of the dispensing machine. The output Q from device B1 couples to the NAND gate G5 providing at the output thereof a low lever signal coupled to the timer 12 for initiating a count down of the timer 12, from an initial count set by the switch S2. The low level signal to the timer 12 from gate G5 essentially lifts a reset condition so that the timer 12 can be clocked from line 25 which couples in turn by way of inverter 14 from an output of the basic clock 18. Thus, the timer 12 is counted down at the basic clock rate of, for example, 0.2 seconds. During the counting down sequence, the output on line 34 from the timer 12 is high but once the timer 12 has counted down, the output on line 34 changes to a low level signal which is coupled to the bistable B2 for setting the bistable device. When this occurs, there is a low level signal on the output Q which provides a high level drive signal through inverter 15 to the line P. As discussed previously, this signal causes energization of the motor M of FIG. 1 thus initiating product flow. Thus, it can be seen that the duration of the count down of timer 12 determines the period between initiation of the liquid by a high signal on line L and initiation of the product by a high signal on line P. It is the resetting of the devices B1 and B2 at the respective gates G2 and G4 that determines the termination of the liquid and product flow.

The enabling of gate G5 is also of course conditioned upon its two other inputs being at their high levels which means that the timer 12 can only be initiated when the flip-flow B2 is reset and the flip-flop B3 is also reset. The flip-flop B3 may be referred to as a post-rinse latch. This device B3 is operated from the output of the timer 14 as discussed in more detail hereinafter.

The timer or clock 18 in addition to providing the basic clock signal at a period of 0.2 seconds also has an output on line 27 which represents a clock of longer duration such as 3.5 seconds. This signal couples by way of line 27 to the NAND gate G6 enables this gate but only after the fixed interval of 3.5 seconds which represents a fixed minimum interval over which both the liquid and product are dispensed. The timer 14 essentially times from this initial basic interval of, for example, 3.5 seconds. The other input to gate G6 are valid when the bistable device B2 is set meaning the product is being dispensed, and further when device B3 is reset.

After the termination of the 3.5 second minimum interval determined by the output on line 27 from device 18, the device 14 is then enabled by way of gate G6 and this device receives clock pulses from line 25 to decrement the device 14 from an initial count set by the switch S3. It is noted that at the end of the 3.5 count interval, there is no resetting of bistable devices B1 or B2. It is only at the end of the time interval as determined by the 3.5 seconds and the time of device 14 that further resetting action occurs by way of a signal on the output line 15 from device 14 which couples to the bistable device B3 for setting device B3 to provide a high level output on its Q output and a low level on its Q output. The resetting of the devices B1 and B2 is now dependent upon whether in the positive or negative post-rinse mode. As previously assumed, in the negative mode, the line 22 is high thus providing a high enabling signal to the gate G7 which is a NAND gate. Because the bistable device B3 is also now set, the gate G7 has both of its inputs high thus providing a low level signal on line 21 which initiates operation of the clock 20. During the timing interval of the clock 20 the output line 23 is normally low but will go to its high state at the end of the interval determined by circuit 30. When this occurs, the output from inverter 16 is low thus resetting by way of line 37 the bistable device B2 causing termination of the product. However, prior thereto and at the time that the bistable device B3 sets, a low level signal at the output of gate G7 on line 40 couples to gate G2 to reset the bistable B1 thus terminating liquid flow first. After the liquid flow has terminated, then product flow terminates a short time thereof in the range of 0.25 to 0.5 seconds by the signal on line 37 from the device 20. The range of the negative post cycle is determined by adjustment of the potentiometer R15 of circuit 30.

When the bistable device B2 is reset by the signal on line 37, the signal from inverter 15 also couples to gate G8 causing a high level output therefrom which is inverted from inverter 17 to a low level signal coupled to the bistable device B3 for causing a resetting thereof thus signalling an effective termination of the basic cycle.

The device 16 is not operated in the negative post-rinse mode because in that mode, the line 22 is high holding the device 16 reset by way of the input to the device via diode D6. The diodes D6 and D7 effectively form a gate wherein the device 16 is permitted to time out only when both of these diodes are reverse biased by low level signals at the input anode of each diode.

For an ultimate sequence of operation wherein the control is set for a positive post-rinse interval rather than a negative post-rinse interval, the line 22 is set to its low state by means of a setting of the switch S1. This low signal by way of gate G7 effectively disables the clock 20 by maintaining the line 21 at the input to the clock at a high level. For the positive post-rinse mode, the initial portion of this cycle may be the same as with the negative post-rinse mode. Thus, after the timer 14 times out and the device B3 is set there is no action by way of the gate G7 but the low output signal from the device B3 at its output Q reverse biases diode B7. Because this is the positive mode, both diodes D6 and D7 are reverse biased providing a low input to the timer 16 causing the timer to count down in accordance with the setting of switch S4. The switch S4 determines the duration of this post-rinse interval. When the timer 16 has timed out, there is a signal on line 43 at the output of the timer which goes from a normal high level to a resetting low level at time out. This low level signal is coupled all the way over to the gate G2 of the device B1 causing a resetting of this device. This resetting, however, only occurs at the end of the post-rinse period. Before the resetting of device B1, device B2 is reset directly upon setting of the post-rinse latch B3. It is noted that the cathodes of diodes D6 and D7 couple by way of line 45 to the gate G4. Thus, when the cathodes of these diodes go to ground, because both diodes are reversed biased, then line 45 goes low resetting the bistable flip-flop type device B2. In summary, for the positive post-rinse mode of operation, after the main portion of the cycle is completed, the device B3 is set, and at the same time the device B2 resets interrupting further product flow, the device 16 then times out, defining the duration of the post-rinse interval and at the termination of the interval the device B1 is reset to at that time terminate liquid flow. The duration of this positive post-rinse interval is controlled by the switch S4 which can be put into a number of different positions for providing a post interval of anywhere from zero to 1.8 seconds in 0.2 second increments, for example.

When the device 16 times out, as previously mentioned, the line 43 goes to its low state and there is a delayed signal coupled by way of resistor R20, delayed by capacitor C9, to one input of gate G8 causing the output of gate G8 to move to its high state causing a low output from device 17 which causes a resetting of the post-rinse latch B3.

At this time operation has been discussed with reference to a single basic cycle of operation. However, it is noted that the setting of the device B1 which initiates substantially all operation, can also be accomplished by way of a second line 50 rather than by way of the inverter 12. A low level signal can be provided on line 50 at the output of gate G9 where all of the inputs are at their high level. One of the inputs to the gate G9 indicates that the device B1 is reset while another one indicates that the device B3 is reset. The third input 51 couples from a further bistable device B4 which comprises the gates G10 and G11 both of which are NAND gates including the conventional cross-coupling to provide the bistable operation. Thus, the lines 51 essentially controls the recycling operation as long as a previous liquid phase has been completed and as long as the post-rinse latch has been reset.

As previously mentioned, the switch S1 has three outputs which couple to the timer 10 for providing a binary coded decimal input. When the operator of the machine closes the switch Y4 for a larger portion rather than the switch Y3 there is a positive signal coupled by way of the diode D5 to the inverter 12 for initiating the operation by setting the bistable device B1. At the same time this signal is inverted by inverter 17 to set the bistable device B4 so that the line 51 is at its high, enabling level which enable a repeat cycle by again setting the device B1. Each time that the device B1 is set, there is a counting signal on line 57 to the device 10 to count the device down. This counting operation continues for as long as the device B4 is in its set state with a low level signal coupling from the Q output of gate G11 to the device 10. The output from device 10 is on line 59 and is normally at a high state during count down of the device 10. However, when the device B1 is set for its last cycle so that the timer 10 now times out, the line 59 goes to its low state resetting the bistable device B4 and reverting the line 51 from the device to its low level, thereby inhibiting any further resetting on line 50 of the bistable device B1. Before the device 10 is clocked down to its resetting position, line 51 is maintained in its high state because the device B4 has not yet been reset and thus each time that the latch B3 is reset with the device B1 also being reset, there is a repeat level on line 50 for reactivating or reinitiating the next cycle. Again, this action commences with the device 10 being clocked via line 57 each time that a new cycle commences as signalled by a setting of the bistable device B1. The switch S1 may be set so that the device 10 counts only once or so that the device counts any predetermined number of times to repeat the basic cycle for providing larger portions. Upon a repeat of a basic cycle depending upon whether in positive or negative post-rinse mode, the liquid and product are again dispensed usually with a pre-rinse period of liquid only during each basic cycle that is repeated. This technique has produced extremely uniform consistency of the final product and much better consistency then can be obtained by varying the length of the main portion of the cycle such as by varying the output signals from the basic clock 18 to extend the 3.5 second interval, for example.

It is noted in FIG. 2B that there are again RC circuits associated with each of the switches Y1–Y4. Thus, the switch Y1 couples to resistor R19 which in turn couples to capacitor C10 and shunt resistor R10 coupled across capacitor C10. The other networks that are described are substantially the same including a series resistance of substantial value. Herein, this resistor, such as resistors R21 and R22, have a value of 330K ohms. The shunt resistors also preferably all have a value of 3.3 megohms as described previously with regard to FIG. 1. Again, the logic gates that are employed such as gates G1, G2, G10 and G11 and all other gates are CMOS gates having a high input impedance.

Below is a list of specific components as to their value and type used in the circuits of FIGS. 2A and 2B.

C1-3 22 uf, 16 V, +80%-20% Tantalum-G.E. #TA07E226KB
C4-4 0.005 uf, GMV, 1.6 KV-Ceramic
C6–10 0.02 uf, 20 V, +80%-20%-Ceramic
C11 5600 pf, ±10%, 100 V Polycarbonate or Polystyrene
C12 680 pf, ±10%, 100 V Polycarbonate or Polystyrene
C13 0.02 uf, 20 V, +80%-20%-Ceramic
D1 1N4001
D2-5 1N4148
IC1-2 CMOS 4060BE
IC3-6 CMOS 4029BE
IC7 CMOS 4012BE
IC8-9 CMOS 4023BE
IC10-11 CMOS 4011BE
IC12 CMOS 4069BE
Q1-2 T2301PD T2301
R3, R4, 47 ¼ 10%
R1 120, 1 W 10%
R2, R5 47 ¼ w, 10%
R6 2.2, ¼ w, 10%
R7, R9 6.5k, ¼ w, 10%
R-10, 12, 13, 14 3.3 Meg., ¼ w, 10%
R17-18 2K, ¼ 10%
R19, 21, 22 330K, ¼ w, 10%
R24 22K, ¼ w, 10%
R25 29K, ¼ w, 5%
R26 15 Element Network 56K, AB 316A
R27 Control 20K, ¼ w Horz. Mount Trimmer Piher PT-10 V
R29 Control 50K, ¼ w Horz. Mount Trimmer Piher PT-10 V
R20, 23, 30, 31 150K, ¼ w 10%
S2-4 Binary 10 Position EECO 23002G
S1 Dip 4PST Grayhill
Z1 1N4742
R28-Control 50K, ¼ w. Horz. Mount Trimmer Piher PT-10 V
R8-5100 ±5%, ¼ watt
R11, R15-470K, ¼ watt, 10%

Figure 3:
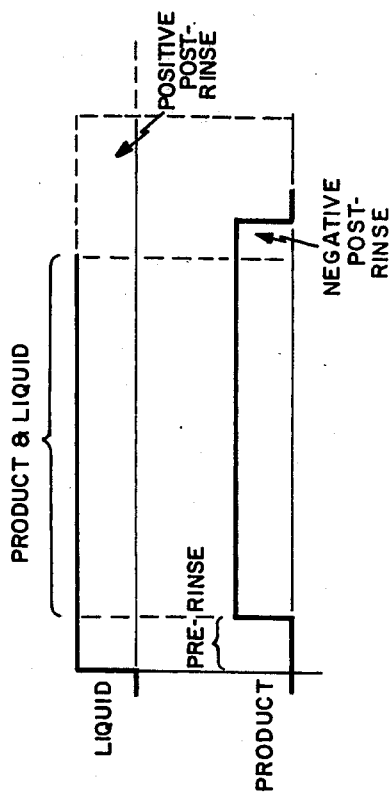
FIG. 3 is a cross-sectional view through a touch switch employed with the electrical schematics shown in FIGS. 1 and 2.
Figure 3:
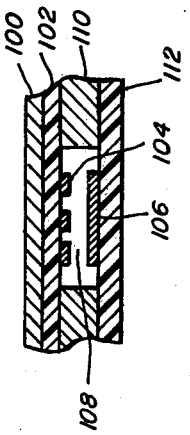

The switches X1–X5 shown in FIG. 1, and the switches Y1, Y4 shown in FIG. 2, may each be of the momentary touch switch type. The general construction is shown in FIG. 3. Each switch comprises a printed panel face 100, which overlies a flexible surface 102 having secured thereto conductive printed tracks 104. These tracks are spaced from a contactor plate 106 by means of a capacitive air gap 108. The spacing is facilitated by means of a spacer 110 depicted in FIG. 3. The contactor plate 106 is supported on a common panel backing 112. This backing 112 is common to each of the switches as indicated by the common line in FIG. 1. Pressure in a downward direction in FIG. 3 will cause a flexing of the member 102 so that the tracks 104 can come into contact with the contact plate 106 to cause a closing of the switch. Upon release the switch opens, there being a separation between the tracks and the contact plate.

What is claimed is:

1. A touch control system for operating a timer having a plurality of different control-inputs and operated from an alternating voltage source, comprising:
   logic control circuitry including a plurality of logic control circuits respectively coupled to each control input of the timer for controlling the operation thereof;
   a plurality of resistive networks each having an input, an output, at least one series resistor of large value for the purpose of limiting fault currents and an operating voltage terminal,
   a switch array including a plurality of contact touch switches each having open and closed positions and including separate switch contacts and a common contact which is common to all switches,
   means coupling the output of each resistive network to the corresponding logic control circuit,
   means coupling the separate switch contact to the corresponding input of each resistive network,
   said logic control circuitry having a high input impedance,
   means for establishing operating voltages for at least the resistive network and switch array from said alternating voltage source and comprising means for establishing a first alternating voltage and means for establishing a second alternating voltage that deviates from said first alternating voltage by a predetermined voltage throughout the alternating voltage waveform,
   means coupling said first alternating voltage to the common contact of all switches of the switch array,
   and means coupling said second alternating voltage to the operating voltage terminal of the resistive network.

2. A touch control system as set forth in claim 1 wherein said input impedance of the logic control circuitry is at least on the order of 100K ohm.

3. A touch control system as set forth in claim 2 wherein said logic control circuitry is of the CMOS type.

4. A touch control system as set forth in claim 3 wherein said logic control circuitry includes CMOS logic gates.

5. A touch control system as set forth in claim 1 wherein each switch includes a flexible contact in part defining a capacitive air gap.

6. A touch control system as set forth in claim 1 wherein each resistive network includes a pair of series resistors having a total resistance at least on the order of 100K ohms.

7. A touch control system as set forth in claim 6 including a shunt resistor of value greater than the series resistor value, said shunt resistor coupling from said operating voltage terminal to one side of said series resistor.

8. A touch control system as set forth in claim 7 wherein the shunt resistor has a value of at least 1 Meg ohm.

9. A touch control system as set forth in claim 8 wherein the shunt resistor has a value on the order of 3.3 Meg ohm.

10. A touch control system as set forth in claim 9 including a capacitor across the shunt resistor.

11. A touch control system as set forth in claim 6 including a further resistor in series with the switch common contact.

12. A touch control system as set forth in claim 1 including means coupling said first and second alternating voltages to said logic control circuits for providing biasing power therefor.

13. A touch control system as set forth in claim 1 wherein said means for establishing the first and second alternating voltages establishes a voltage deviation of logic circuit level substantially less than peak-to-peak voltage of either of said alternating voltages.

14. A touch control system as set forth in claim 1 wherein said resistive network further comprises a shunt resistor coupling from said operating voltage terminal to one side of said series resistor.

15. A touch control system as set forth in claim 1 wherein each logic control circuit comprises a logic gate means and further including means coupling the first and second alternating voltages to said logic gate means for providing biasing power therefor.

* * * * *